United States Patent Office 2,776,318
Patented Jan. 1, 1957

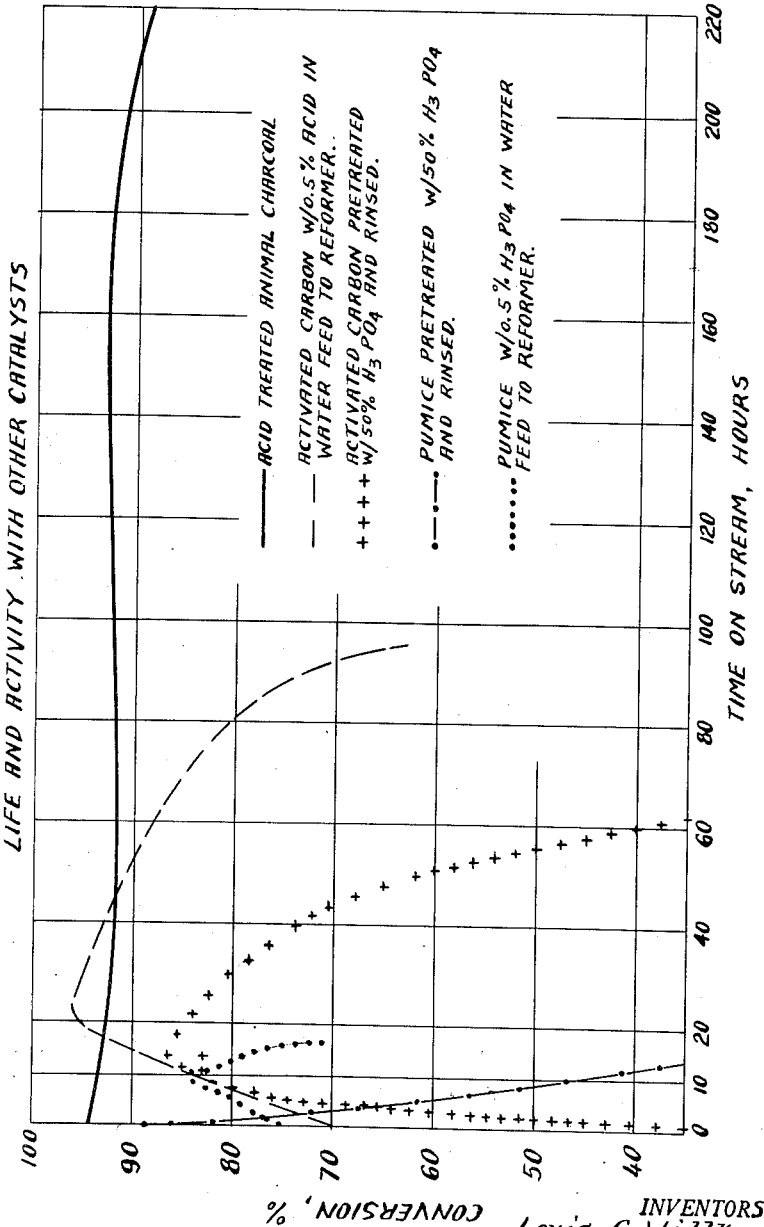
Fig. 1. Comparison of animal charcoal catalyst life and activity with other catalysts.
INVENTORS.
Louis G. Willke
Carroll G. Cullen
BY
ATTORNEY.

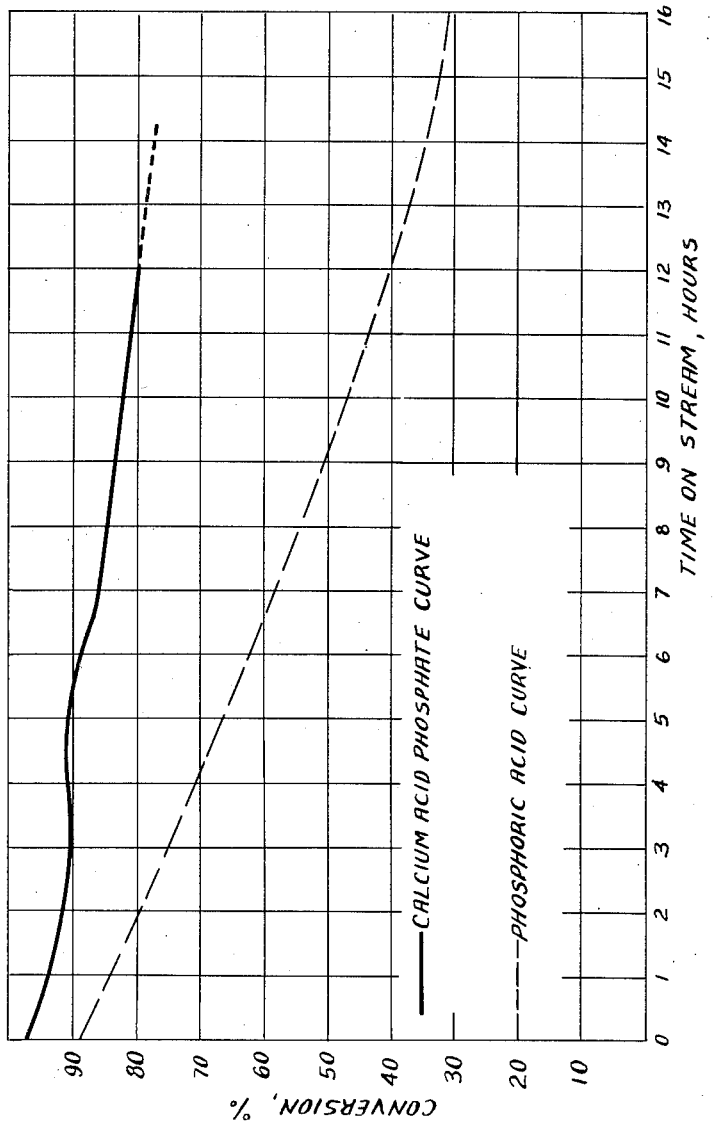

2,776,318
HYDROLYSIS OF METHYLAL

Louis G. Willke and Carroll G. Cullen, Barnsdall, Okla., assignors to Cities Service Oil Company, Bartlesville, Okla., a corporation of Delaware Application February 26, 1953, Serial No. 338,968

8 Claims. (Cl. 260—606)

This invention relates to improvements in the hydrolysis of methylal and more particularly to the catalytic hydrolysis of methylal in the vapor phase.

In the past the hydrolysis of methylal has been accomplished by passing methylal and water vapors, at suitable temperatures, over phosphoric acid catalysts. For example, U. S. Patent 2,605,287, to Newcombe, discloses a process in which the catalyst is phosphoric acid treated activated charcoal, while Stautzenberger in U. S. Patent 2,537,169 prefers pumice impregnated with phosphoric acid as the catalyst.

A commercial process by which crude solutions of formaldehyde and methanol, such as the crude chemical solutions described by Stautzenberger, may be purified by converting the methanol and formaldehyde components of the crude to methylal, distilling the methylal from the impurities in the crude mixture, and recovering chemically pure methanol and formaldehyde by methylal hydroylsis, has long been sought. The difficulty, however, in the processes disclosed by Newcombe and Stautzenberger, has been in catalyst life. Apparently the phosphoric acid used in these processes, while effective to hydrolyze the methylal, also promotes side reactions which deposit carbon on the catalyst, rapidly destroying its effectiveness. In some instances the catalyst activity, as measured by conversion of methylal to hydrolysis products in one pass through the reactor, may drop from about 90% to 40% or lower, in less than 15 hours of operation. Needless to say, no process can be put on a commercial basis unless the catalyst used can maintain its activity at a high level over long periods of time.

It is an object of this invention to provide a methylal hydrolysis catalyst which is highly active to promote methylal hydrolysis, while minimizing undesirable side reactions.

It is a further object of this invention to provide a catalyst which will maintain its activity over a sufficiently long period of time to permit a methylal hydrolysis process to be placed on a commercial basis.

In order that those skilled in the art may fully understand my improved process and catalyst, it will be described in detail in connection with the acompanying drawings in which Fig. 1 shows graphically the activity and life of a number of catalysts, including our preferred catalyst together with the catalysts of the prior art, and Fig. 2 shows graphically the activity and life of another of our catalysts compared with the preferred catalyst of Stautzenberger.

The apparatus used in practicing our new process is identical with that illustrated in U. S. Patent 2,605,287 to Newcombe, so that it is not believed necessary to describe it in detail herein. The process flow in our process is identical with that of Newcombe, and consists essentially of continuously passing a mixture of methylal and water in the vapor phase through an externally heated catalyst chamber packed with our preferred catalysts. Effluent from the catalyst chamber, comprising formaldehyde, methanol, water, and unconverted methylal is cooled and passed to a still in which methylal is taken overhead for recycle to the process, and in which a bottoms product comprising formaldehyde, methanol, and water is recovered. The bottoms is then passed to another still in which methanol is taken overhead and a C. P. formalin solution is recovered as bottoms. The methanol, although sufficiently pure for most purposes, may be subjected to a finishing treatment, such as a caustic wash, to yield a C. P. product.

We have found that if a cataylst comprising an acid phosphate is substituted for the phosphoric acid catalyst of the prior art, improved yields of valuable products are obtained per pass through the reactor, and the catalyst will maintain a conversion activity of 90% or more for preiods in excess of 200 hours of continuous operation.

Our preferred catalyst is animal (bone) charcoal which has been activated with dilute phosphoric acid. The acid reacts with the charcoal, which contains about 75% tricalcium phosphate, producing acid salts. Our practice has been to cover the charcoal with dilute phosphoric acid of from about 7½% to 15% concentration by weight, and to allow the charcoal to stand in contact with the acid at room temperature for a period of about one hour, after which the spent acid solution is drained from the charcoal, and the charcoal is rinsed once with an equal volume of pure water. Most of the acid is consumed in the reaction.

The rinsed charcoal can be used immediately, but our normal practice is to dry it, break up any agglomerations, and screen out all fines. It can then be stored conveniently and used as needed. Prepared in this way the granules are easily handled and the catalyst beds are not subject to a rapid increase in pressure drop.

Catalyst which has declined in activity through use in the process may be regenerated by treatment as described above, the regenerated catalyst having no significant differences in activity or catalyst life from catalyst prepared from new charcoal. The acid concentration required for regeneration is normally about one-half of that required for new charcoal.

Fig. 1 compares the activity and catalyst life of our preferred phosphoric acid treated animal charcoal with that of a number of other catalysts. The tests were all run under similar conditions except that since the optimum reforming temperature has been found to vary somewhat with different catalysts, in all cases the optimum reforming temperature as regards both conversion and catalyst life was used.

It will be noted that our preferred acid treated animal charcoal had an initial conversion activity of about 94%, and that conversions of 90% or over may be maintained for a period of about 215 hours, after which conversions began to fall off more rapidly. In contrast, a catalyst prepared by treating activated carbon with 50% phosphoric acid, followed by rinsing, according to the directions given by Newcombe, had an initial activity of only about 35%, which increased to about 87% after 14 hours of operation, and thereafter dropped off rapidly until the activity had fallen back to 35% after only 62 hours. Pumice impregnated with phosphoric acid according to Stautzenberger had even less catalyst life. The initial activity of this catalyst was about 88%, but activity fell off quite rapidly until after only 14 hours of operation it had dropped to 35%.

The other two runs illustrated in Fig. 1 were made in the hope that the activity of activated charcoal and pumice supported catalysts could be maintained by including 0.5% phosphoric acid in the water feed to the hydrolysis reactor. The theory behind this procedure was that it might be possible to continuously regenerate the catalyst in situ by continuous deposition of phosphoric acid on the support. As may be seen from the figure, some improvement in catalyst life may be obtained by following this procedure, but the catalysts do not compare in efficiency and life to our preferred new catalyst. Thus, the activated charcoal supported catalyst, when operating with phosphoric acid in the feed water, had an initial activity of 70%, the activity rising until a peak efficiency of 96% was reached after 23 hours on stream. Thereafter the activity decreased rapidly until it had dropped to 65% after 95 hours of operation. The pumice supported catalyst, under similar operating conditions, showed an initial activity of 73%, which rose until a peak of 84% had been reached after 10 hours of operation, after which the activity dropped rapidly until it reached 71% after 17 hours on stream.

In operating with our new catalyst, it has been found that good conversions may be obtained at temperatures as low as 400° F., and that conversions reach a maximum at about 550° F. At higher temperatures there is a tendency to the formation of carbonaceous by-products which cause catalyst deactivation. We therefore prefer to operate at temperatures of from 475° F. to 525° F. with the animal charcoal catalyst in order to secure maximum conversions while maintaining catalyst activity, although temperatures as high as 575° F. may be used. We also prefer to operate at a mol ratio of water to methylal in the feed of about 3:1 in order to recover a formaldehyde solution containing about 40 to 44% HCHO, which may be cut back to a standard inhibited formalin solution by addition of methanol. The process is quite flexible, however, and if the water-methylal ratio is reduced to about 1:1, formaldehyde solutions containing upwards of 80% formaldehyde may be recovered. Solutions of this strength are very desirable as feed stocks for further concentration, by vacuum distillation, to paraformaldehyde. Such strong formaldehyde solutions are obtainable, however, only at a sacrifice in conversion per pass.

We also prefer to introduce feed to the hydrolyzer at the rate of from about 750 to about 850 grams of methylal per hour per liter of catalyst. Lower feed rates reduce the capacity of the unit, whereas at higher rates a lower percentage conversion per pass is obtained. This variable is not too important, however, since at the higher rates the increase in total conversion may well balance the cost of recovering and recycling unreacted methylal.

In order to illustrate more clearly the effect of the foregoing variables, operating conditions and yields from a number of experimental runs are given in the following table, 1000 ml. of catalyst packed in a tube being used in each case.

Table I

| Run No. | 1 | 2 | 3 | 4 | 5 | 6 | 7 | 8 |
|---|---|---|---|---|---|---|---|---|
| Test Period, hrs. | 7 | 7 | 3½ | 3½ | 3½ | 6½ | 3½ | 6 |
| Methylal feed, g./hr. | 783 | 779 | 779 | 779 | 785 | 867 | 770 | 1,138 |
| Mol ratio, water to methylal | 2.91 | 2.99 | 2.95 | 2.98 | 2.85 | 1.98 | 0.94 | 3.18 |
| Reaction Temp., °F. | 506 | 408 | 423 | 450 | 549 | 502 | 500 | 500 |
| Percent HCHO in solution after stripping methanol and methylal | 43.1 | 31.7 | 35.8 | 39.8 | 44.3 | 55.2 | 80.9 | 36.7 |
| Conversion, Percent | 93.0 | 65.7 | 72.8 | 86.3 | 94.7 | 88.5 | 70.0 | 82.5 |

Run 1 represents a run made under preferred conditions to produce a 43% formaldehyde solution, runs 2, 3, 4, and 5, illustrate the effect of different temperatures on conversions and the strength of the formaldehyde solution obtained, runs 6 and 7 show the effect of varying the mol ratio of water to methylal in the feed, and run 8 is one in which the feed rate was above the optimum.

While the foregoing description has related solely to our preferred catalyst, phosphoric acid treated animal charcoal, other catalysts comprising acid phosphates have also been demonstrated to be superior to the phosphoric acid catalysts of the prior art. Fig. 2 shows a comparison of a catalyst made by impregnating pumice with calcium acid phosphate with a phosphoric acid or pumice catalyst made according to the Stautzenberger disclosure. While the activity of the acid phosphate catalyst declines somewhat more rapidly than our animal charcoal catalyst, yet at the end of 12 hours of operation it shows double the activity of the Stautzenberger catalyst.

Acid ferric phosphate also shows far better results than acid treated pumice. Acid ferric phosphate catalyst was formed by pouring a mixture of 25 ml. of phosphoric acid, 2 grams of ferric phosphate, and 100 ml. of water over 1000 ml. of pumice in the reaction tube. The following table shows the results of a run with this catalyst compared with a run made with phosphoric acid treated pumice under similar conditions.

Table II

| Catalyst | Acid Ferric Phosphate | Phosphoric Acid on Pumice |
|---|---|---|
| Test period, hrs. | 10.75 | 9.5 |
| Methylal feed, g./hr. | 779 | 760 |
| Water-methylal ratio | 3.02 | 2.98 |
| Reaction temp., °F. | 575 | 600 |
| Percent HCHO after stripping | 40.4 | 31.4 |
| Conversion, percent | 87.3 | 67.4 |

It will be appreciated from the foregoing that our new acid phosphate catalysts are far superior, both in initial activity and in catalyst life, to any of the methylal hydrolysis catalysts disclosed in the prior art, and provide, for the first time, a catalyst stable enough to permit commercial refining of crude methanol and formaldehyde solutions via the methylal route.

Having now described our invention, what is claimed is:

1. The process of hydrolyzing methylal including continuously passing a feed stock comprising methylal and water over an animal charcoal catalyst comprising an acid phosphate at a temperature of from about 400° F. to about 575° F., and recovering a hydrolyzate comprising methanol and formaldehyde.

2. The process according to claim 1 in which the catalyst comprises calcium acid phosphate.

3. The process according to claim 1 in which the catalyst comprises acid ferric phosphate.

4. The process according to claim 1 in which the catalyst comprises animal charcoal which has been reacted with phosphoric acid in a sufficient amount to convert at least a part of the calcium phosphate content of the animal charcoal to calcium acid phosphate.

5. The process of producing formaldehyde and methanol including continuously passing in vapor phase a feed stock comprising methylal and water in the ratio of from about one mol to about three mols of water to one mol of methylal over an animal charcoal catalyst comprising an acid phosphate at a temperature of from about 400° F. to about 575° F., continuously recovering a hydrolyzate, separating unreacted methylal from the hydrolyzate, and fractionating the hydrolyzate to recover as an overhead product substantially pure methanol, and a substantially pure aqueous solution of formaldehyde as a bottoms product.

6. The process according to claim 5 in which the catalyst comprises calcium acid phosphate.

7. The process according to claim 5 in which the catalyst comprises acid ferric phosphate.

8. The process according to claim 5 in which the catalyst comprises animal charcoal which has been reacted with phosphoric acid in a sufficient amount to convert at least a part of the calcium phosphate content of the animal charcoal to calcium acid phosphate.

References Cited in the file of this patent

UNITED STATES PATENTS

| | | |
|---|---|---|
| 2,373,153 | Tollefson | Apr. 10, 1945 |
| 2,464,902 | Stuart | Mar. 22, 1949 |
| 2,517,720 | Schaad | Aug. 8, 1950 |
| 2,605,287 | Newcombe | July 29, 1952 |

FOREIGN PATENTS

| | | |
|---|---|---|
| 203 | Great Britain | Jan. 22, 1870 |